United States Patent [19]

Jaquiss et al.

[11] Patent Number: 4,532,290

[45] Date of Patent: Jul. 30, 1985

[54] STABILIZED POLYCARBONATE-POLYESTER COMPOSITIONS

[75] Inventors: Donald B. G. Jaquiss, New Harmony; Russell J. McCready; John A. Tyrell, both of Mt. Vernon, all of Ind.

[73] Assignee: General Electric Company, Pittsfield, Mass.

[21] Appl. No.: 606,353

[22] Filed: May 2, 1984

[51] Int. Cl.$^3$ .......................... C08K 3/32; C08L 69/00
[52] U.S. Cl. .................................. 524/417; 524/601; 524/604; 524/605; 525/466; 525/470
[58] Field of Search ............... 524/417, 601, 604, 605; 525/466, 470

[56] References Cited

U.S. PATENT DOCUMENTS

| | | | |
|---|---|---|---|
| 3,201,369 | 8/1965 | Dell et al. | 524/417 |
| 3,404,122 | 10/1968 | Fritz et al. | 524/417 |
| 3,953,539 | 4/1976 | Kawase et al. | 524/417 |
| 4,366,276 | 12/1982 | Freitag et al. | 524/417 |
| 4,366,279 | 12/1982 | Tomioka et al. | 524/417 |

Primary Examiner—Lester L. Lee
Attorney, Agent, or Firm—John W. Harbour; William F. Mufatti; Edward A. Hedman

[57] ABSTRACT

Compositions comprising predominately a polycarbonate resin, e.g., poly(bisphenol A carbonate), and a polyester resin, e.g., poly(1,4-butylene terephthalate), alone, or in combination with one or more second resins, are melt stabilized with monosodium phosphate and/or monopotassium phosphate.

15 Claims, No Drawings

STABILIZED POLYCARBONATE-POLYESTER COMPOSITIONS

This invention relates generally to polycarbonate-polyester resin compositions, alone, or in further combination with other resins, and more particularly to methods for stabilizing blends of high molecular weight linear thermoplastic polycarbonates and polyesters against undesirable changes in melting point.

BACKGROUND OF THE INVENTION

Polyester resins derived from terephthalic acid and reactive derivatives thereof, such as dimethyl terephthalate, and alkanediols of from e.g., 1 to 10 inclusive carbon atoms, e.g., ethylene glycol and 1,4-butanediol, as well as related diols, such as 1,6-cyclohexane dimethanol, and mixtures of such resins have been known for some time and have become important constituents in injection moldable compositions. Workpieces molded from such polyester resin compositions, alone, or combined with reinforcements, offer a high degree of surface hardness and abrasion resistance, high gloss, and lower surface friction. More recently, blends of such polyester resins with one or more second resins have become of significant commercial interest because such second resins, carefully selected, can greatly improve impact strength, as well as tensile strength, modulus and distortion temperature under load in parts molded from such compositions. By way of illustration, such second resins can comprise minor proportions aromatic polycarbonate resins, as described for example, in Kawase et al, U.S. Pat. No. 3,953,539. Also known are such blends in further combination with other resins, such as polyacrylate resins. See, for example, Cohen and Dieck, U.S. Pat. No. 4,257,937.

All such polycarbonate-polyester resin compositions have, however, a tendency to be unstable in the molten states as evidenced by a change in melting point. Especially troublesome in this respect are polycarbonate resin compositions containing minor proportions of polyester resins. Such compositions seem to undergo a chemical reaction commonly referred to as "jumbling". The "jumbling" reaction may be due to catalyst residues remaining in the polyester resin because some success has been achieved in using organic phosphites as melt stabilizers, see, e.g., Hofrichter, Jr., U.S. Pat. No. 2,650,213; and W. German Offen No. 2,710,729; and as color stabilizers in polycarbonate resins, Fritz et al, U.S. Pat. No. 3,305,520. However, considerable variability in the effectiveness of jumbling suppression has been observed with such phosphites, and more reliable melt stabilizers are needed.

It has now been discovered that two specific inorganic phosphorus reagents, monosodium phosphate and monopotassium phosphate, alone, or in combination, are highly effective to stabilize such polycarbonate-polyester resin compositions containing, predominantly, polycarbonate, especially if the polyester is made with a titanium compound catalyst, e.g., tetra octyl titanate. Monosodium phosphate and monopotassium phosphate, both rather innocuous, mildly acidic reagents, are surprisingly effective as stabilizers for polycarbonate-polyester compositions. The stabilizers can be used in various manners, including prior incorporation as a concentrate in the polycarbonate resin, or in the polyester resin. In addition to the high degree of reliability as stabilizers in such compositions, monosodium phosphate and/or monopotassium phosphate do not detrimentally affect any of the resinous components in the composition, e.g., the polycarbonates, or the polyesters, because the prior art mono ammonium phosphates, as will be shown later, at the same levels degrade the individual polymers. In addition, monosodium phosphate appears to be unique as a stabilizer for polycarbonate-polyester blends comprising predominantly polycarbonate because it is superior to the chemically closely related disodium phosphate, as will be shown later.

Especially difficult to melt stabilize are combinations of polycarbonates and polyester resins with third resins such as polyacrylates, as well as flame retarded blends of polycarbonates and polyesters. Such formulations are rendered reliably melt stable with monosodium phosphate and/or monopotassium phosphate, according to the present invention. In addition to the specific instances noted above, melt stabilization can also be induced in other combinations of polycarbonates with polyesters and other resins, especially those in which an active catalyst was used to prepare one or all of the polymers in the blend.

SUMMARY OF THE INVENTION

According to the present invention, there are provided thermoplastic compositions comprising predominantly a polycarbonate and at least one polyester resin derived from terephthalic acid or a reactive derivative thereof and an alkanediol, alone, or in further combination with at least one additional resin, melt stabilized with monosodium phosphate and/or monopotassium phosphate.

DESCRIPTION OF THE INVENTION

Any amount of the monosodium and/or monopotassium phosphate will melt stabilize a polycarbonate-polyester resin blend. Preferably, however, from about 0.01 parts to about 7.5 parts by weight of the phosphate should be used, and most preferably, from about 0.1 parts to about 4.0 parts by weight should be used, based on 100 parts by weight of the total polyester resinous component (b) in the composition. Although the phosphates are, as mentioned, relatively innocuous, amounts larger than about 10.0 parts by weight should be used with caution since such larger amounts will provide melt stability, but might also deleteriously affect the mechanical properties of one or more of the resins in the composition.

The phosphate of the invention may be mixed with the polymers by any suitable means. Since most phosphates are solids, they can be most expeditiously mixed with the resin either as a precompounded concentrate, or directly into the melt, e.g., in an extruder.

Generally, all thermoplastic resins made with active catalysts, e.g., titanium catalysts, are melt unstable, and all such resins can be treated with inorganic phosphates according to this invention. The polycarbonate resins can be produced from a diphenol and phosgene or a phosgene precursor, such as from a dihydroxy diaryl alkane, e.g., bisphenol-A and phosgene or a diester of carbonic acid, see, e.g., Schnell et al, Canadian Pat. No. 578,585. As indicated above, the polyester resins can be produced from terephthalic acid or a reactive derivative thereof and an alkanediol or cyclohexane dimethanol, such as, for example, processes described in Whinfield and Dickson, U.S. Pat. No. 2,465,319.

The ratio of polycarbonate resin to polyester resin is also important, if not critical to the present invention. For every 100 parts of polycarbonate resin component (a) there must be present no less than 5 and no more than 95, and preferably between 10 and 70 parts by weight of polyester resin component (b).

Those embodiments of the invention which are melt-stabilized flame retardant thermoplastic polycarbonate-polyester resin compositions are made by including the monosodium and/or monopotassium phosphate in compositions rendered flame retardant with an effective amount of one or more flame retardant additives, in conventional ways. Such additives are, for example, bromine- or chlorine-containing compounds, e.g., decabromodiphenyl ether, a polycarbonate of tetrabromobisphenol A or a copolycarbonate of tetrabromobisphenol A and bisphenol A, and the like, alone, or preferably, combined with a synergist, such as antimony trioxide. The examples which follow will show melt stabilization of a number of such compositions according to the present invention.

DESCRIPTION OF THE PREFERRED EMBODIMENTS

The following examples illustrate the present invention, but are not intended to limit the scope of the claims in any manner whatsoever. All parts are by weight unless otherwise specified.

EXAMPLES 1-2

Compositions are prepared by co-extruding poly(bisphenol A)carbonate (General Electric Company LEXAN ®145) and poly(1,4-butylene terephthalate) (General Electric Company VALOX ®315) in a vacuum-vented 1¾ in. Sterling extruder operated at 400° F. (zone 1); 425° F. (zone 2); 450° F. (zone 3); and 475° F. (at the die).

Melt viscosities were measured in a Tinius-Olsen Extrusion Plastometer. For control and comparison purposes, a composition omitting stabilizing additives, and three containing additives proposed by the prior art were also made and tested. The formulations used, and the results obtained are set forth in Table 1:

TABLE 1

| COMPOSITIONS COMPRISING AROMATIC POLYCARBONATES AND POLYESTERS | | | | | | | |
|---|---|---|---|---|---|---|---|
| EXAMPLE | 1A* | 1 | 2 | 2A** | 2B** | 2C** | 2D** |
| COMPOSITION (parts) | | | | | | | |
| Poly(bisphenol A) carbonate | 1100 | 1100 | 1100 | 1100 | 1100 | 1100 | 1100 |
| Poly(1,4-butylene) terephthalate | 900 | 900 | 900 | 900 | 900 | 900 | 900 |
| ADDITIVE | | | | | | | |
| Control | 0 | — | — | — | — | — | — |
| monosodium phosphate (NaH$_2$PO$_4$) | — | 10 | — | — | — | — | — |
| monopotassium phosphate (KH$_2$PO$_4$) | — | — | 10 | — | — | — | — |
| disodium phosphate (Na$_2$HPO$_4$) | — | — | — | 10 | — | — | — |
| monoammonium phosphate ((NH$_4$)H$_2$PO$_4$) | — | — | — | — | — | — | — |
| diammonium phosphate (NH$_4$)$_2$HPO$_4$) | — | — | — | — | — | 10 | — |
| dipotassium phosphate (K$_2$HPO$_4$) | — | — | — | — | — | — | 10 |
| PROPERTIES | | | | | | | |
| melting point, °C. | 205 | 218 | 219 | 214 | 218 | 217 | 211 |
| melt viscosity, poise | 11,300 | 11,200 | 9,600 | 9,800 | 4,600 | 2,800 | 6,550 |

*Control
**Comparison

The combination of high melting points and high melt viscosities demonstrate the advantages of monosodium phosphate and monopotassium phosphate (Examples 1 and 2). The lowering of melting point demonstrates the jumbling effect (Control 1A and Comparison Example 2A). The loss in melt viscosity demonstrates degradation of at least one of the polymeric components by the ammonium compounds (Comparison Examples 2B and 2C).

EXAMPLE 3

The general procedure of Example 1 was used to prepare and test a formulation of poly(bisphenol A carbonate)/poly(1,4-butylene terephthalate) impact modified with a polyacrylate resin (Rohm & Haas ACRYLOID ® KM 653). The formulations used and the results obtained are set forth in TABLE 2:

TABLE 2

| IMPACT-MODIFIED POLYCARBONATE POLYESTER COMPOSITIONS | | |
|---|---|---|
| EXAMPLE | 3A* | 3 |
| COMPOSITION (parts) | | |
| Poly(bisphenol A carbonate) | 2500 | 2500 |
| Poly(1,4-butylene terephthalate) | 1200 | 1200 |
| Polyacrylate resin | 500 | 500 |
| Antioxidant | 40 | 40 |
| Monosodium phosphate (NaH$_2$PO$_4$) | 0 | 20 |
| PROPERTIES | | |
| Melting point, °C. | 210 | 219 |

*Control

The stabilizing effect of monosodium phosphate is demonstrated by the higher melting point of Example 3 in comparison to the control.

EXAMPLE 4

A flame retardant composition was prepared, molded and tested by the general procedure of Examples 1-2. The formulation used and the properties obtained were as set forth in Table 3:

TABLE 3

| FLAME-RETARDANT POLYCARBONATE-POLYESTER COMPOSITIONS | | |
|---|---|---|
| EXAMPLE | 4A* | 4 |
| COMPOSITION (parts) | | |
| Poly(bisphenol-A)carbonate | 700 } 974 | 700 } 974 |
| Poly(tetrabromobisphenol-A) carbonate | 274 | 274 |
| Poly(1,4-butylene terephthalate) | 900 | 900 |
| Antimony oxide | 82 | 82 |
| Ethylene/vinyl acetate copolymer | 44 | 44 |
| Poly(tetrafluoroethylene) | 8 | 8 |

TABLE 3-continued

FLAME-RETARDANT POLYCARBONATE-POLYESTER COMPOSITIONS

| EXAMPLE | 4A* | 4 |
|---|---|---|
| Monosodium phosphate (NaH$_2$PO$_4$) | 0 | 30 |
| PROPERTIES | | |
| Melting point, °C. | 205 | 219 |
| Flammability rating, Underwriters' Bulletin Flame Test (UL-94), 60 mil sample | V-O | V-O |

*Control

The high melting point demonstrates the effectiveness of monosodium phosphate to melt stabilize those normally difficult to stabilize flame-retardant compositions, while maintaining the highest flammability rating.

The above-mentioned patents and publications are incorporated herein by reference. Obviously, many variations of the present invention will suggest themselves to those skilled in this art in light of the above, detailed description. For example, instead of poly(1,4-butylene terephthalate) there can be substituted poly(ethylene terephthalate) alone or in a 50:50 admixture with poly(1,4-butylene terephthalate). Conventional additives such as clay, mica, pigments and colorants all can be added in conventional amounts. All such obvious variations are within the full intended scope of the appended claims.

What is claimed is:

1. A thermoplastic composition comprising:
   (a) 100 parts by weight of an aromatic polycarbonate resin;
   (b) 5 to 95 parts by weight of at least one polyester resin prepared by reacting terephthalic acid or a reactive derivative thereof and an alkane diol; and
   (c) a melt-stabilizing amount of monosodium phosphate, monopotassium phosphate or a mixture thereof.

2. A composition as defined in claim 1 wherein said polyester resin component (b) comprises 10 to 70 parts by weight.

3. A composition as defined in claim 1 wherein said polyester has been polymerized with a titanium compound catalyst.

4. A composition as defined in claim 1 containing from about 0.01 to about 7.5 parts of said phosphate per 100 parts by weight of said polyester (b).

5. A composition as defined in claim 1 containing from about 0.1 to about 4.0 parts of said phosphate per 100 parts by weight of said polyester (b).

6. A composition as defined in claim 1 wherein component (c) is monosodium phosphate.

7. A composition as defined in claim 1 wherein said aromatic polycarbonate resin (a) is derived from a diphenol and phosgene or a phosgene precursor.

8. A composition as defined in claim 7 wherein said aromatic polycarbonate resin (a) is poly(bisphenol A carbonate).

9. A composition as defined in claim 1 wherein said polyester resin (b) comprises poly(1,4-butylene terephthalate).

10. A composition as defined in claim 1 wherein said polyester resin (b) comprises poly(ethylene terephthalate).

11. A composition as defined in claim 1 wherein said polyester resin (b) comprises an admixture of poly(1,4-butylene terephthalate) and poly(ethylene terephthalate).

12. A composition as defined in claim 1 wherein the polycarbonate resin (a) comprises poly(bisphenol A carbonate) and the polyester resin (b) comprises poly(1,4-butylene terephthalate).

13. A composition as defined in claim 1 which also includes (d) an impact modifier resin.

14. A composition as defined in claim 13 wherein the impact modifier resin comprises a polyacrylate resin.

15. A composition as defined in claim 1 which also includes a flame-retardant amount of a flame retardant additive or combination of such additives.

* * * * *